(12) United States Patent
Kubota (10) Patent No.: US 11,110,741 B2
(45) Date of Patent: Sep. 7, 2021

(54) RAILWAY WHEEL (71) Applicant: NIPPON STEEL & SUMITOMO METAL CORPORATION, Tokyo (JP)

(72) Inventor: Manabu Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 496 days.

(21) Appl. No.: 16/074,137

(22) PCT Filed: Feb. 28, 2017

(86) PCT No.: PCT/JP2017/007841
§ 371 (c)(1),
(2) Date: Jul. 31, 2018

(87) PCT Pub. No.: WO2017/150545
PCT Pub. Date: Sep. 8, 2017

(65) Prior Publication Data
US 2020/0269632 A1 Aug. 27, 2020

(30) Foreign Application Priority Data
Mar. 2, 2016 (JP) .............................. JP2016-039929

(51) Int. Cl.
*B60B 17/00* (2006.01)
*C21D 9/00* (2006.01)
(Continued)

(52) U.S. Cl.
CPC .............. *B60B 17/00* (2013.01); *B32B 15/00* (2013.01); *B32B 15/01* (2013.01); *B32B 15/011* (2013.01);
(Continued)

(58) Field of Classification Search
CPC ........ B60B 2900/141; B60B 2360/102; B60B 17/00; C22C 38/14; C22C 38/12;
(Continued)

(56) References Cited

U.S. PATENT DOCUMENTS

2009/0053095 A1* 2/2009 Robles Hernandez ....................
C22C 38/02
420/90
2011/0303756 A1 12/2011 Ueda et al.

FOREIGN PATENT DOCUMENTS

CN 2008274367 A 11/2008
CN 101497968 A 8/2009
(Continued)

OTHER PUBLICATIONS

Machine Translation, Wang et al., CN 101497968 A, Aug. 2009. (Year: 2009).*

(Continued)

*Primary Examiner* — Michael E. La Villa
(74) *Attorney, Agent, or Firm* — Greer, Burns & Crain, Ltd.

(57) ABSTRACT

To provide a railway wheel which is excellent in corrosion fatigue resistance. The railway wheel according to the present embodiment has a chemical composition consisting of: in mass %, C: 0.65 to 0.80%, Si: 0.10 to 1.0%, Mn: 0.10 to 1.0%, P: not more than 0.030%, S: not more than 0.030%, Cr: 0.05 to 0.20%, Sn: 0.005 to 0.50%, Al: 0.010 to 0.050%, N: 0.0020 to 0.015%, Cu: 0 to 0.20%, Ni: 0 to 0.20%, Mo: 0 to 0.20%, V: 0 to 0.20%, Nb: 0 to 0.030%, and Ti: 0 to 0.030%, with the balance being Fe and impurities. A plate portion has a matrix structure composed of pearlite.

4 Claims, 4 Drawing Sheets

(51) Int. Cl.
| | |
|---|---|
| C22C 38/00 | (2006.01) |
| C22C 38/02 | (2006.01) |
| C22C 38/04 | (2006.01) |
| C22C 38/06 | (2006.01) |
| C22C 38/18 | (2006.01) |
| C21D 9/04 | (2006.01) |
| C22C 38/14 | (2006.01) |
| C22C 38/12 | (2006.01) |
| C22C 38/20 | (2006.01) |
| C22C 38/16 | (2006.01) |
| C22C 38/24 | (2006.01) |
| C22C 38/22 | (2006.01) |
| C22C 38/28 | (2006.01) |
| C22C 38/26 | (2006.01) |
| C22C 38/40 | (2006.01) |
| B32B 15/00 | (2006.01) |
| B32B 15/01 | (2006.01) |
| C22C 38/08 | (2006.01) |
| B32B 15/18 | (2006.01) |
| C21D 1/18 | (2006.01) |

(52) U.S. Cl.
CPC ............ *B32B 15/18* (2013.01); *C21D 9/0068* (2013.01); *C21D 9/04* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/40* (2013.01); *B60B 2360/102* (2013.01); *B60B 2900/141* (2013.01); *B60Y 2200/30* (2013.01); *C21D 1/18* (2013.01); *C21D 2211/009* (2013.01); *Y10T 428/12951* (2015.01); *Y10T 428/12958* (2015.01); *Y10T 428/12965* (2015.01); *Y10T 428/12972* (2015.01); *Y10T 428/21* (2015.01); *Y10T 428/218* (2015.01); *Y10T 428/219* (2015.01); *Y10T 428/24273* (2015.01); *Y10T 428/24281* (2015.01)

(58) Field of Classification Search
CPC ......... C22C 38/20; C22C 38/16; C22C 38/24; C22C 38/22; C22C 38/28; C22C 38/26; C22C 38/40; C22C 38/001; C22C 38/002; C22C 38/008; C22C 38/02; C22C 38/04; C22C 38/06; C22C 38/18; C22C 38/08; C21D 9/04; C21D 9/0068; C21D 1/18; C21D 2211/009; B60Y 2200/30; B32B 15/00; B32B 15/01; B32B 15/011; B32B 15/18; Y10T 428/21; Y10T 428/218; Y10T 428/219; Y10T 428/24273; Y10T 428/24281; Y10T 428/12951; Y10T 428/12958; Y10T 428/12965; Y10T 428/12972
See application file for complete search history.

(56) References Cited

FOREIGN PATENT DOCUMENTS

| | | |
|---|---|---|
| JP | 2012107295 A | 6/2012 |
| JP | 2013231212 A | 11/2013 |
| RU | 2485201 C2 | 6/2013 |
| WO | 2012056785 A1 | 5/2012 |
| WO | 2013111407 A1 | 8/2013 |

OTHER PUBLICATIONS

EESR issued in corresponding European Application No. 17158696.9, dated Jul. 7, 2017.

* cited by examiner

RAILWAY WHEEL

This is a National Phase Application filed under 35 U.S.C. § 371, of International Application No. PCT/JP2017/007841, filed Feb. 28, 2017, the contents of which are incorporated by reference.

TECHNICAL FIELD

The present invention relates a wheel, and more specifically to a railway wheel used for a railway vehicle.

BACKGROUND ART

For highly efficient railway transportation, efforts have been made to increase loading weight on railway vehicles and also increase the speed of railway vehicles. Accordingly, studies have been conducted on reduction of fatigue damage due to rolling contact with a rail and improvement of wear resistance.

Techniques for improving wear resistance of railway wheels have been proposed in Japanese Patent Application Publication No. 2012-107295 (Patent Literature 1) and Japanese Patent Application Publication No. 2013-231212 (Patent Literature 2).

The steel for wheel disclosed in Patent Literature 1 consists of: in mass %, C: 0.65 to 0.84%, Si: 0.02 to 1.00%, Mn: 0.50 to 1.90%, Cr: 0.02 to 0.50%, V: 0.02 to 0.20%, and S: not more than 0.04%, with the balance being Fe and impurities, wherein Fn1 represented by Formula (1) is 34 to 43, and Fn2 represented by Formula (2) is not more than 25. Here, Formula (1) is given as $Fn1=2.7+29.5C+2.9Si+6.9Mn+10.8Cr+30.3Mo+44.3V$, and Formula (2) as $Fn2=0.76\times exp(0.05C)\times exp(1.35Si)\times exp(0.38Mn)\times exp(0.77Cr)\times exp(3.0Mo)\times exp(4.6V)$.

The wheel for railway vehicle disclosed in Patent Literature 2 consists of: in mass %, C: 0.65 to 0.84%, Si: 0.4 to 1.0%, Mn: 0.50 to 1.40%, Cr: 0.02 to 0.13%, S: not more than 0.04%, and V: 0.02 to 0.12%, with the balance being Fe and impurities, wherein Fn1 represented by Formula (1) is 32 to 43, and Fn2 represented by Formula (2) is not more than 25. Here, Formula (1) is given as $Fn1=2.7+29.5C+2.9Si+6.9Mn+10.8Cr+30.3Mo+44.3V$, and Formula (2) as $Fn2=exp(0.76)\times exp(0.05C)\times exp(1.35Si)\times exp(0.38Mn)\times exp(0.77Cr)\times exp(3.0Mo)\times exp(4.6V)$.

The above described Patent Literatures 1 and 2 disclose that wear resistance of railway wheels is improved when Formula (1) is satisfied.

By the way, in railway transportation, it is also anticipated that when a wheel mounted on a railway vehicle is subjected to a very severe corrosive environment, corrosion fatigue in which corrosion and fatigue are combined occurs. The corrosion fatigue is a fatigue phenomenon which is generated by repeated stress in a corrosive environment. Specifically, it is anticipated that when a plate portion of a railway wheel is exposed to a corrosive environment, a corrosion pit is formed, and a fatigue phenomenon occurs in which the corrosion pit acts as an origin of crack. Therefore, a wheel to be used for a railway vehicle is also required of corrosion fatigue resistance.

Techniques for improving corrosion resistance of steel have been proposed in International Application Publication No. WO2012/056785 (Patent Literature 3), International Application Publication No. WO2013/111407 (Patent Literature 4), and Japanese Patent Application Publication No. 2008-274367 (Patent Literature 5).

The steel for machine structure for casehardening disclosed in Patent Literature 3 consists of: in mass %, C: 0.30 to 0.60%, Si: 0.02 to 2.0%, Mn: 0.35 to 1.5%, Al: 0.001 to 0.5%, Cr: 0.05 to 2.0%, Sn: 0.001 to 1.0%, S: 0.0001 to 0.021%, N: 0.0030 to 0.0055%, Ni: 0.01 to 2.0%, Cu: 0.01 to 2.0%, P: not more than 0.030%, and O: not more than 0.005%, with the balance being Fe and inevitable impurities, wherein Formulae (1) to (3) are satisfied. Here, Formula (1) is given as $-0.19 \leq 0.12 \times Sn+Cu-0.1 \times Ni \leq 0.15$, Formula (2) as 60 Mn/S 300, and Formula (3) as $Sn \geq 0.2 \times Cr$.

The case hardening steel material disclosed in Patent Literature 4 has a chemical composition consisting of: in mass %, C: 0.05 to 0.45%, Si: 0.01 to 1.0%, Mn: more than 0 to 2.0%, Al: 0.001 to 0.06%, N: 0.002 to 0.03%, S: more than 0 to 0.1%, P: more than 0 to 0.05%, further at least not less than one type of Mo, V, Nb, Cu, Ni, Cr, and Sn, and the balance: Fe and inevitable impurities, and satisfies Formulae (1) to (3). Here, Formula (1) is given as $Re=(Ae/Ao)\times 100 \leq 30\%$, Formula (2) as $(Cmin, 1/Co) \geq 0.95$, and Formula (3) as $(Cmin, 2/Co) \geq 0.95$. The macro structure of this case hardening steel material has a cross section including an equiaxial crystal region and a columnar crystal region disposed in the surrounding of the equiaxial crystal region.

The bolt steel disclosed in Patent Literature 5 consists of: in mass %, C: 0.15 to 0.6%, Si: 0.05 to 0.5%, Mn and Cr: 0.5 to 3.5% in total, P: not more than 0.05%, S: not more than 0.03%, Cu: less than 0.3%, Ni: less than 1%, O: not more than 0.01%, and Sn: 0.05 to 0.50%, with the balance being Fe and impurities. Further, the bolt steel has a composition in which Cu/Sn ratio is not more than 1.

CITATION LIST

Patent Literature

Patent Literature 1: Japanese Patent Application Publication No. 2012-107295

Patent Literature 2: Japanese Patent Application Publication No. 2013-231212

Patent Literature 3: International Application Publication No. WO2012/056785

Patent Literature 4: International Application Publication No. WO2013/111407

Patent Literature 5: Japanese Patent Application Publication No. 2008-274367

SUMMARY OF INVENTION

Technical Problem

The above described Patent Literatures 3 to 5 disclose that containing Sn improves corrosion resistance of steel. However, in Patent Literatures 3 to 5, no study has been conducted on a railway wheel and corrosion fatigue resistance of the railway wheel. Therefore, when the techniques of Patent Literatures 3 to 5 are used for a railway wheel, there may be cases in which strength turns out to be insufficient and/or sufficient corrosion fatigue resistance cannot be obtained.

It is an objective of the present invention to provide a railway wheel which is excellent in corrosion fatigue resistance.

Solution to Problem

The railway wheel according to the present embodiment has a chemical composition consisting of: in mass %, C:

0.65 to 0.80%, Si: 0.10 to 1.0%, Mn: 0.10 to 1.0%, P: not more than 0.030%, S: not more than 0.030%, Cr: 0.05 to 0.20%, Sn: 0.005 to 0.50%, Al: 0.010 to 0.050%, N: 0.0020 to 0.015%, Cu: 0 to 0.20%, Ni: 0 to 0.20%, Mo: 0 to 0.20%, V: 0 to 0.20%, Nb: 0 to 0.030%, and Ti: 0 to 0.030%, with the balance being Fe and impurities. A plate portion of the railway wheel has a matrix structure composed of pearlite.

Advantageous Effects of Invention

A railway wheel according to the present embodiment has excellent corrosion fatigue resistance.

DESCRIPTION OF EMBODIMENTS

The inventor of the present invention has conducted investigation and study on corrosion fatigue resistance of railway wheels by using railway wheels having various chemical compositions and microstructures, and have obtained the following findings.

When a railway wheel in a semi-manufactured state before coating is transported by sea on a ship, the railway wheel is exposed to moisture (dew condensation), salt water, and flying salt. At this moment, a corrosion pit may be formed in the railway wheel. The railway wheel is used after being coated. If, while the railway wheel is used, the coating of a plate portion of the railway wheel is damaged and removed due to secular deterioration and collision with a foreign object (rock etc.) and thus steel of the starting material is exposed and subjected to an atmospheric environment (including a case in which flying salt is present), a corrosion pit may be formed in the railway wheel. A corrosion pit occurred in such a situation may possibly cause deterioration of corrosion fatigue resistance.

To prevent such corrosion fatigue of a railway wheel, it is effective to improve the corrosion resistance of steel in the atmosphere and flying salt, thereby suppressing the formation of a deep corrosion pit which acts as an initiation site of fatigue crack. To improve the corrosion resistance of steel, it is effective to include a large amount of Cr and Ni in steel to form a stainless steel. However, including Cr and Ni will raise raw material cost. Further, productivity and strength of steel will deteriorate. Further, Cr forms carbides in high carbon steel for use in railway wheels. For that reason, it is difficult to ensure an amount of dissolved Cr which contributes to corrosion resistance. Therefore, steel containing a large amount of Cr and Ni is not suitable for use in railway wheels.

As so far described, to improve corrosion fatigue resistance, it is crucial to suppress formation of a deep corrosion pit in a plate portion of a railway wheel. Including Sn in a railway wheel enables suppression of corrosion and formation of a corrosion pit under a salt water environment. As a result, it is possible to improve corrosion fatigue resistance of steel.

Figure 1:
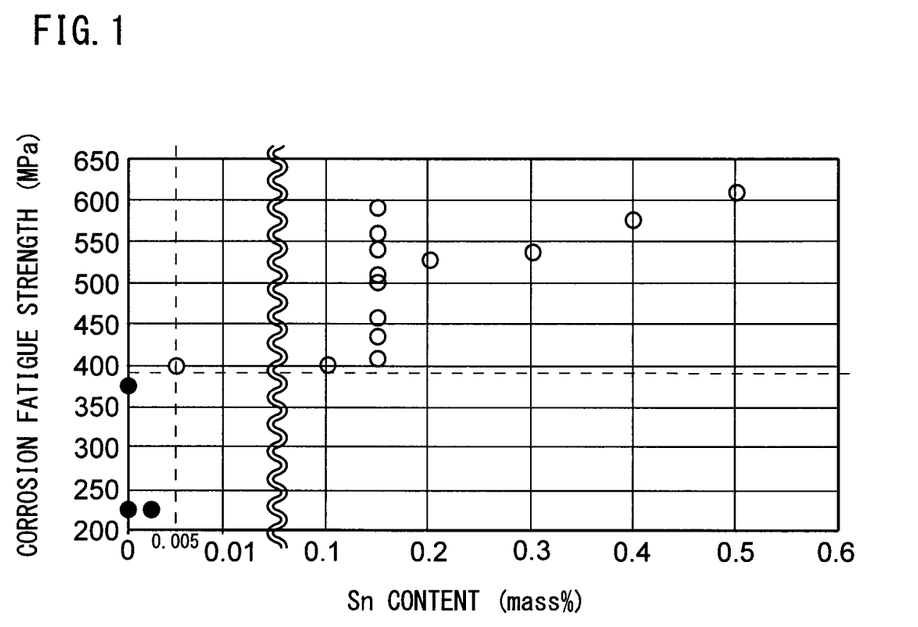
FIG. 1 is a diagram to show a relationship between Sn content and corrosion fatigue strength.

FIG. 1 is a diagram to show a relationship between Sn content and corrosion fatigue strength. FIG. 1 has been obtained from Examples to be described below.

Referring to FIG. 1, including Sn remarkably improves corrosion fatigue strength of a railway wheel. When Sn content is not less than 0.005%, the corrosion fatigue strength will become not less than 400 MPa, thus providing a railway wheel having excellent corrosion fatigue resistance.

[Matrix Structure]

When a plate portion of a railway wheel has a matrix structure of pearlite, a railway wheel having excellent toughness and ductility can be obtained. Sn is concentrated at austenite grain boundaries. Steel composed of non-pearlite structure such as martensite and bainite includes prior austenite grain boundaries. For that reason, fracture is more likely to occur along prior austenite grain boundaries where Sn is concentrated. As a result, toughness and ductility of steel deteriorate. When the matrix structure of steel is pearlite, there will be no prior austenite grain boundary. Therefore, even if Sn is concentrated at prior austenite grain boundaries before cooling, fracture along a grain boundary will not occur since there is no prior austenite grain boundary in the matrix structure (perlite) after cooling. Thus, it is possible to suppress deterioration of toughness and ductility of steel.

A railway wheel of the present embodiment which has been completed based on the above described findings has a chemical composition consisting of: in mass %, C: 0.65 to 0.80%, Si: 0.10 to 1.0%, Mn: 0.10 to 1.0%, P: not more than 0.030%, S: not more than 0.030%, Cr: 0.05 to 0.20%, Sn: 0.005 to 0.50%, Al: 0.010 to 0.050%, N: 0.0020 to 0.015%, Cu: 0 to 0.20%, Ni: 0 to 0.20%, Mo: 0 to 0.20%, V: 0 to 0.20%, Nb: 0 to 0.030%, and Ti: 0 to 0.030%, with the balance being Fe and impurities. A plate portion of the railway wheel has a matrix structure composed of pearlite.

The above described chemical composition may contain, in mass %, at least one element selected from the group consisting of Cu: 0.02 to 0.20% and Ni: 0.02 to 0.20%.

The above described chemical composition may contain, in mass %, at least one element selected from the group consisting of Mo: 0.005 to 0.20%, V: 0.005 to 0.20%, Nb: 0.010 to 0.030%, and Ti: 0.010 to 0.030%.

Hereinafter, a railway wheel of the present embodiment will be described in detail. Symbol "%" regarding elements means mass % unless otherwise stated.

[Chemical Composition]

The chemical composition of a railway wheel of the present embodiment contains the following elements.

C: 0.65 to 0.80%

Carbon (C) increases the strength of steel and improves wear resistance and a fatigue resistance. When C content is too low, such effects cannot be achieved. On the other hand, when C content is too high, the strength of steel becomes excessively high, and machinability during finishing work deteriorates. Therefore, the C content is 0.65 to 0.80%. The lower limit of the C content is preferably 0.67%, and more preferably 0.69%. The upper limit of the C content is preferably 0.75%, and more preferably 0.73%.

Si: 0.10 to 1.0%

Silicon (Si) increases the strength of steel. When Si content is too low, such effect cannot be achieved. On the other hand, when the Si content is too high, the strength of steel becomes excessively high, and the machinability during finishing work deteriorates. Therefore, the Si content is 0.10 to 1.0%. The lower limit of the Si content is preferably 0.15%, and more preferably 0.20%. The upper limit of the Si content is preferably 0.90%, and more preferably 0.80%.

Mn: 0.10 to 1.0%

Manganese (Mn) refines lamellar spacing of pearlite structure, thereby increasing the strength of steel. When the Mn content is too low, such effect cannot be achieved. On the other hand, the Mn content is too high, the machinability during finishing work and the yield in the railway wheel production process deteriorate since a non-pearlite structure such as martensite and bainite is produced. Therefore, the Mn content is 0.10 to 1.0%. The lower limit of the Mn content is preferably 0.50%, and more preferably 0.55%. The upper limit of the Mn content is preferably 0.90%, and more preferably 0.85%.

P: Not More than 0.030%

Phosphorus (P) is an impurity. P segregates at grain boundaries, thereby deteriorating toughness of steel. Therefore, the P content is not more than 0.030%. The upper limit of the P content is preferably 0.025%, and more preferably 0.015%, and more preferably 0.012%. The P content is preferably as low as possible.

S: Not More than 0.030%

Sulfur (S) is inevitably contained. S forms MnS, thereby improving the machinability of steel. On the other hand, when the S content is too high, coarse sulfide inclusions are formed, thereby deteriorating wheel properties such as fatigue strength, toughness, or the like of steel. Therefore, the S content is not more than 0.030%. The upper limit of the S content is preferably 0.025%, and more preferably 0.012%, and more preferably 0.010%. The lower limit of the S content for improving machinability is preferably 0.008%.

Cr: 0.05 to 0.20%

Chromium (Cr) as well as Mn refines the lamellar spacing of pearlite structure, thereby increasing the strength of steel. When the Cr content is too low, such effect cannot be achieved. On the other hand, when the Cr content is too high, the machinability during finishing work and the yield in the wheel production process deteriorate since a non-pearlite structure such as martensite and bainite is produced. Therefore, the Cr content is 0.05 to 0.20%. The lower limit of the Cr content is preferably 0.07%. The upper limit of the Cr content is preferably 0.18%, and more preferably 0.16%.

Sn: 0.005 to 0.50%

Tin (Sn) improves the corrosion resistance of steel. Further, Sn suppresses formation of a corrosion pit which acts as an origin of fatigue crack, thereby improving the corrosion fatigue resistance of a wheel. When the Sn content is too low, such effects cannot be achieved. On the other hand, when the Sn content is too high, the hot ductility of steel deteriorates, thus impairing the productivity of steel. Therefore, the Si content is 0.005 to 0.50%. The lower limit of the Sn content is preferably 0.15%, and more preferably 0.20%. The upper limit of the Sn content is preferably 0.40%, and more preferably 0.35%.

Al: 0.010 to 0.050%

Aluminum (Al) forms a stable nitride even in a high temperature range. Al nitride suppresses coarsening of austenite grains as a pinning particle during heating for quenching, thereby refining the structure of steel. As a result, the balance between the strength, and the toughness and ductility of steel is improved. Further, Al is an effective element for deoxidizing steel during smelting. On the other hand, when the Al content is too high, coarse inclusions are produced, thereby deteriorating toughness. Therefore, the Al content is 0.010 to 0.050%. The lower limit of the Al content is preferably 0.015%, and more preferably 0.020%. The upper limit of the Al content is preferably 0.045%, and more preferably 0.040%. The Al content mentioned herein means the content of acid-soluble Al (sol. Al).

N: 0.0020 to 0.015%

Nitrogen (N) forms a stable nitride even in a high temperature range, and the nitride suppresses coarsening of austenite grains as a pinning particle during heating for quenching, thereby refining the structure of steel. On the other hand, when the N content is too high, coarse inclusions are produced, thereby deteriorating toughness. Therefore, the N content is 0.0020 to 0.015%. The lower limit of the N content is preferably 0.0030%. The upper limit of the N content is preferably 0.0080%, and more preferably 0.0070%.

The balance of the chemical composition of the railway wheel according to the present embodiment consists of Fe and impurities. Here, the term impurity means those which are introduced from ores and scraps as raw materials, production environments, or the like when industrially producing the railway wheel, and those which are permitted within a range not adversely affecting the railway wheel of the present embodiment.

[Optional Elements]

The above described railway wheel may further contain, in place of part of Fe, at least one element selected from the group consisting of Cu and Ni. Any of these elements is an optional element, and improves hardenability of steel thereby increasing the strength of steel.

Cu: 0 to 0.20%

Copper (Cu) is an optional element and may not be contained. When contained, Cu increases the strength of steel. However, when the Cu content is too high, the hot ductility of steel deteriorates, and the productivity deteriorates. Therefore, the Cu content is 0 to 0.20%. The lower limit of the Cu content is preferably 0.02%, and more preferably 0.04%. The upper limit of the Cu content is preferably 0.15%, and more preferably 0.13%.

Ni: 0 to 0.20%

Nickel (Ni) is an optional element and may not be contained. When contained, Ni improves the strength and toughness of steel. However, when the Ni content is too high, the raw material cost increases. Therefore, the Ni content is 0 to 0.20%. The lower limit of the Ni content is 0.02%, and more preferably 0.04%. The upper limit of the Ni content is preferably 0.15%, and more preferably 0.13%.

The above described railway wheel may further contain, in place of part of Fe, at least one element selected from the group consisting of Mo, V, Nb, and Ti. Any of these elements is an optional element, and refines the structure of steel, thereby increasing the strength of steel.

Mo: 0 to 0.20%

Molybdenum (Mo) is an optional element and may not be contained. When contained, Mo increases the strength of steel by precipitation strengthening. Further, Mo as well as Mn and Cr refines the lamellar spacing of pearlite structure, thereby increasing the strength of steel. However, when the Mo content is too high, a non-pearlite structure such as martensite and bainite is produced, and the machinability during finishing work and the yield in the wheel production process deteriorate. Therefore, the Mo content is 0 to 0.20%. The lower limit of the Mo content is preferably 0.005%, and more preferably 0.008%. The upper limit of the Mo content is preferably 0.15%, and more preferably 0.13%.

V: 0 to 0.20%

Vanadium (V) is an optional element and may not be contained. When contained, V forms fine carbides and increases the strength of steel by precipitation strengthening. However, when the V content is too high, a non-pearlite structure such as martensite and bainite is produced, and the machinability during finishing work and the yield in the wheel production process deteriorate. Therefore, the V content is 0 to 0.20%. The lower limit of the V content is preferably 0.005%, and more preferably 0.007%. The upper limit of the V content is preferably 0.15%, and more preferably 0.13%.

Nb: 0 to 0.030%

Niobium (Nb) is an optional element and may not be contained. When contained, Nb forms a nitride and carbide in a high temperature range and refines the structure of steel, thereby increasing the strength of steel. However, when the Nb content is too high, the hot ductility of steel deteriorates and the productivity during continuous casting deteriorates. Therefore, the Nb content is 0 to 0.030%. The lower limit of the Nb content is preferably 0.010%, and more preferably 0.012%. The upper limit of the Nb content is preferably 0.025%, and more preferably 0.022%.

Ti: 0 to 0.030%

Titanium (Ti) is an optional element and may not be contained. When contained, Ti forms a nitride and carbide in a high temperature range and refines the structure of steel, thereby increasing the strength of steel. However, when the Ti content is too high, the toughness of steel deteriorates. Therefore, the Ti content is 0 to 0.030%. The lower limit of the Ti content is preferably 0.010%, and more preferably 0.012%. The upper limit of the Ti content is preferably 0.025%, and more preferably 0.022%.

[Matrix Structure]

Figure 2:
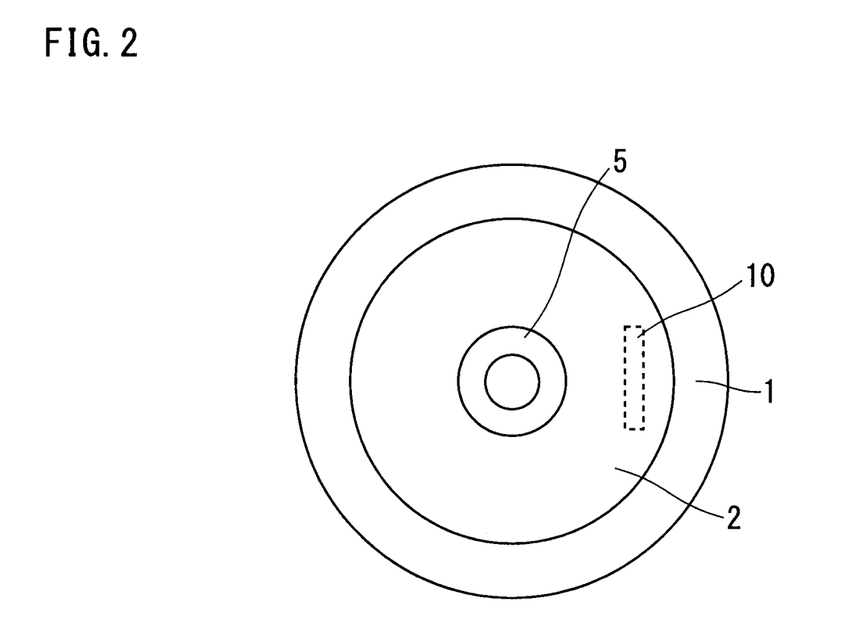
FIG. 2 is a front view viewed from the front of a railway wheel.
Figure 3:
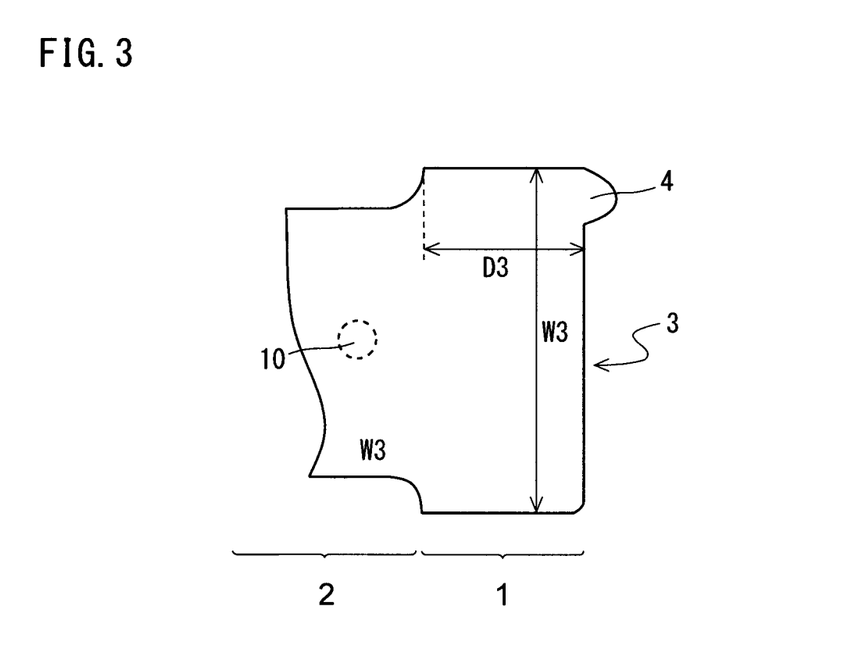
FIG. 3 is a side view viewed from a part of the side of a railway wheel.

FIG. 2 is a front view viewed from the front of the railway wheel of the present embodiment, and FIG. 3 is a cross-sectional view of a portion near the rim portion of the railway wheel of the present embodiment. Referring to FIGS. 2 and 3, the railway wheel includes a rim portion 1, a plate portion 2, and a boss portion 5. The rim portion 1 is disposed at the outer edge of the railway wheel and includes a tread 3 which contacts the rail. The boss portion 5 is formed at the center portion of the railway wheel. A through hole is formed in the center of the boss portion 5, and an axle is press-fitted into the through hole.

The plate portion 2 is formed between the rim portion 1 and the boss portion 5 and is connected to the rim portion 1 and the boss portion 5. The thickness of the plate portion 2 is thinner than the thickness of the rim portion 1 and the thickness of the boss portion 5.

The matrix structure of the plate portion 2 of the railway wheel is composed of pearlite. In the present description, the statement "matrix structure is composed of pearlite" means that area fraction of pearlite is not less than 95% in the matrix structure of a plate portion 2.

When a railway wheel which is composed of a non-pearlite structure such as martensite and bainite contains Sn, Sn will concentrate at prior austenite grain boundaries, thereby deteriorating the mechanical property of the railway wheel. Specifically, its toughness and ductility deteriorate, and the wheels are more prone to cracks. When the matrix structure of the plate portion 2 of the railway wheel is composed of pearlite, there is no prior austenite grain boundary. Therefore, it is possible to achieve a railway wheel which is less prone to cracks and excellent in corrosion fatigue resistance.

Note that preferably, in the matrix structure, hyper-eutectic cementite deteriorates the toughness of steel. Therefore, a lower area fraction of hyper-eutectic cementite in the plate portion 2 is preferable.

Note that the matrix structure of the rim portion 1 of the railway wheel is composed of pearlite like the plate portion 2. That is, in the matrix structure of the rim portion 1, the area ratio of pearlite is 95% or more. On the other hand, in the matrix structure of the boss portion 5 of the railway wheel, the area ratio of pearlite is 85% or more, and the area ratio of pro-eutectoid ferrite is 15% or less.

The matrix structure is measured by the following method. A sample is obtained from the railway wheel (in the plate portion 2, if the thickness of the plate portion 2 is defined as t, the position is t/4 depth from the surface). Out of the surfaces of the obtained sample, a surface perpendicular to the circumferential direction of the plate portion 2 is selected for the observation surface. After being polished, the observation surface is etched with 3% nitric acid alcohol (nital corrosive liquid). The etched observation surface is observed with an optical microscope with a magnification of 500 to produce photographic images of 5 arbitrary visual fields.

In each visual field, each phase of pearlite, ferrite, bainite, martensite, or the like exhibits different contrast, respectively. Therefore, based on the contrast, each phase is determined. The area ($\mu m^2$) of pearlite, out of the determined phases, in each visual field is found. A pearlite area fraction (%) is defined as a ratio of the sum total of the areas of pearlite in all the visual fields to the total area of all the visual fields. The lower limit of the area fraction of pearlite is preferably 95%, and more preferably 98%.

[Production Method]

One example of the production method of the above described railway wheel will be described.

The production method of a railway wheel of the present embodiment includes a step of preparing a raw material (preparation process), a step of forming the railway wheel from the raw material (forming process), and a step of performing heat treatment on the formed railway wheel (heat treatment process). Hereinafter, each step will be described.

[Preparation Process]

Molten steel having the chemical composition described above is produced by using an electric furnace, a converter, or the like. The molten steel is used to produce a raw material. For example, the molten steel is used to produce a cast piece by a continuous casting method. Alternatively, the molten steel is used to produce an ingot by the ingot making method. The cast piece or the ingot is used to produce a billet as raw materials by blooming mill or forging. The raw material may be a cast piece produced by a continuous casting method. The shape of the raw material is preferably columnar.

[Forming Process]

An intermediate product for railway wheels is formed by using the prepared raw material. The raw material is cut in a direction perpendicular to the longitudinal direction. Hot working is performed in a direction perpendicular to the cut surface of the raw material to form into a disk shape. Furthermore, the intermediate product of the railway wheel is formed so as to have a rough shape of the wheels by the hot working. The hot working is, for example, hot forging, hot rolling or the like. Since the intermediate product has the shape of a railway wheel, the intermediate product has a tread 3 and a flange portion 4.

[Heat Treatment Process]

In the heat treatment process, a heat treatment is performed on the intermediate product of the molded railway wheels. Specifically, a heat treatment is performed on the tread 3 and the flange portion 4 of the high-temperature intermediate product after the hot working. After the hot working (hot forging or hot rolling), the intermediate product may be reheated (reheating treatment) and then the heat treatment may be carried out. The heat treatment process includes quenching treatment. After quenching treatment, tempering treatment may be performed. As a result, a hard pearlite structure can be ensured in the tread 3 and the flange portion 4 of the rim portion 1 in the lower layer of the martensitic structure (quenching layer) of the outermost surface layer which can be removed by cutting work.

In quenching, for example, tread quenching by cooling water may be applied. The cooling medium of quenching is not particularly limited as long as a cooling rate suited for a desired structure can be obtained. The cooling medium includes, for example, air, mist, steam (spray), salt bath, etc. Even if tread quenching is applied, the structure of the plate portion 2, which has a lower cooling rate than that of the tread 3 and the flange portion 4, becomes pearlite.

Tempering is performed on the intermediate product after quenching. Tempering can be sufficiently performed at a known temperature and for a known time period. For example, tempering temperature is 400 to 600° C., and soaking time is 60 to 180 minutes.

A railway wheel, which have been produced by the production processes described above, will have a structure in which the area fraction of pearlite is not less than 95% in the plate portion 2. For that reason, the amount of wear of railway wheel will be reduced. Further, it is possible to achieve a railway wheel which is excellent in workability, not prone to cracks, and also excellent in corrosion fatigue resistance even if Sn is contained.

EXAMPLES

Cast pieces having chemical compositions shown in Table 1 were produced by continuous casting. The cast piece had a diameter of 453 mm (φ453 mm). Using the cast pieces, railway wheels were formed by hot forging.

flange portion 4 of the railway wheel after quenching. Since a quenched layer (martensite and bainite as a supercooled structure) exists in the outermost layer of the tread 3, cutting work was performed on the outermost layer of the tread 3 to remove the quenched layer. Through the above process, the railway wheels of test number 1 to 17 were manufactured.

The shapes of the railway wheels were as shown in FIGS. 2 and 3. The diameter of the railway wheel was 1200 mm, the width W 3 of the rim portion 1 was 125 mm, and the thickness D 3 from the tread 3 of the rim 1 was 65 mm.

[Microstructure Observation Test]

A sample for microstructure observation was taken from the position of t/4 depth from the surface of the plate portion 2 by cutting perpendicularly to the surface of the plate portion 2 of the railway wheel. The sample was filled with resin so that the cut surface of the plate part 2 would be the surface to be inspected, and mirror polishing was performed. Thereafter, the microstructure observation was carried out by the above method. As a result of micro observation, in any test number, the area ratio of pearlite in the matrix structure was 95% or more, and the microstructure was substantially pearlite.

[Corrosion Fatigue Strength Test]

Figure 4:
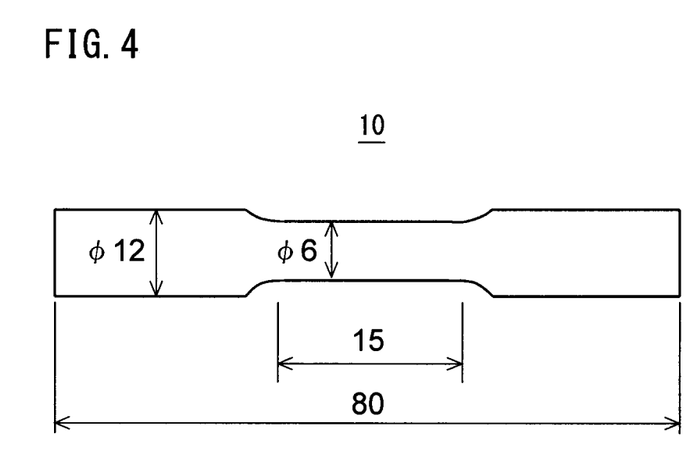
FIG. 4 is a front view of a test specimen of Ono-type rotating bending corrosion fatigue strength, which is used for corrosion fatigue strength evaluation.

An Ono type rotating bending fatigue test piece 10 shown in FIG. 4 was cut out from the positions shown in FIG. 2 and FIG. 3 of the plate portion 2 of the railway wheel of each test number. A test piece was cut out so that the longitudinal direction of the test piece was along the circumferential direction of the wheel.

Referring to FIG. 4, the Ono-type rotating bending fatigue test specimen 10 had a circular cross section, and a parallel portion of a length of 15 mm. Numerals shown without unit in FIG. 4 indicate dimensions (in mm unit) of corresponding regions of the test specimen. In the figure, "φ numerals" indicate diameters (mm) of specified regions.

TABLE 1

| Test No. | Chemical composition (mass %, the balance being Fe and impurities) | | | | | | | | | | | | | | | Pearlite area fraction (%) | Corrosion fatigue strength (MPa) |
|---|---|---|---|---|---|---|---|---|---|---|---|---|---|---|---|---|---|
| | C | Si | Mn | P | S | Cr | Sn | Al | N | Cu | Ni | Mo | V | Nb | Ti | | |
| 1 | 0.66 | 0.30 | 0.70 | 0.015 | 0.010 | 0.10 | 0.15 | 0.030 | 0.004 | — | — | — | — | — | — | 97 | 440 |
| 2 | 0.70 | 0.29 | 0.79 | 0.017 | 0.011 | 0.08 | 0.15 | 0.030 | 0.004 | — | — | — | — | — | — | 98 | 460 |
| 3 | 0.70 | 0.29 | 0.79 | 0.017 | 0.011 | 0.08 | 0.15 | 0.030 | 0.008 | — | 0.20 | — | — | — | — | 98 | 500 |
| 4 | 0.70 | 0.29 | 0.79 | 0.017 | 0.011 | 0.08 | 0.15 | 0.015 | 0.004 | 0.20 | 0.20 | — | — | — | 0.010 | 96 | 540 |
| 5 | 0.70 | 0.29 | 0.79 | 0.017 | 0.011 | 0.08 | 0.15 | 0.010 | 0.004 | — | — | — | 0.010 | — | 96 | 560 |
| 6 | 0.72 | 0.83 | 0.78 | 0.014 | 0.009 | 0.11 | 0.15 | 0.030 | 0.004 | — | — | — | 0.03 | — | — | 99 | 590 |
| 7 | 0.73 | 0.84 | 0.81 | 0.006 | 0.001 | 0.09 | 0.15 | 0.030 | 0.004 | — | — | — | 0.09 | — | — | 95 | 510 |
| 8 | 0.70 | 0.29 | 0.79 | 0.017 | 0.011 | 0.08 | 0.005 | 0.030 | 0.004 | — | — | — | — | — | — | 99 | 400 |
| 9 | 0.70 | 0.29 | 0.79 | 0.017 | 0.011 | 0.08 | 0.10 | 0.030 | 0.004 | — | — | — | — | — | — | 99 | 400 |
| 10 | 0.70 | 0.29 | 0.79 | 0.017 | 0.011 | 0.08 | 0.20 | 0.030 | 0.004 | — | — | — | — | — | — | 99 | 530 |
| 11 | 0.70 | 0.29 | 0.79 | 0.017 | 0.011 | 0.08 | 0.30 | 0.030 | 0.004 | — | — | — | — | — | — | 99 | 540 |
| 12 | 0.70 | 0.29 | 0.79 | 0.017 | 0.011 | 0.08 | 0.40 | 0.030 | 0.004 | — | — | — | — | — | — | 99 | 580 |
| 13 | 0.70 | 0.29 | 0.79 | 0.017 | 0.011 | 0.08 | 0.50 | 0.030 | 0.004 | — | — | — | — | — | — | 99 | 610 |
| 14 | 0.70 | 0.29 | 0.79 | 0.017 | 0.011 | 0.08 | — | 0.030 | 0.004 | — | — | — | — | — | — | 99 | 230 |
| 15 | 0.70 | 0.29 | 0.79 | 0.017 | 0.011 | 0.08 | 0.003 | 0.030 | 0.004 | — | — | — | — | — | — | 99 | 230 |
| 16 | 0.70 | 0.29 | 0.79 | 0.017 | 0.011 | 0.08 | — | 0.030 | 0.004 | — | 0.20 | — | — | — | — | 100 | 380 |
| 17 | 0.70 | 0.25 | 0.70 | 0.015 | 0.011 | 0.07 | 0.15 | 0.030 | 0.004 | — | — | 0.03 | — | — | — | 98 | 460 |

For each of the formed railway wheels, quenching at 850° C. was performed on the tread 3 and the flange portion 4 of the railway wheel. Specifically, a railway wheel heated to 850° C. was cooled by spraying water from a nozzle while the wheel was rotated (so called, "tread quenching"). Further tempering was performed at 450° C. on the tread 3 and the CCT (Cyclic Corrosion Testing) was performed on the Ono-type rotating bending fatigue test specimens 10. To prevent effects of corrosion caused by CCT, portions of the test specimen other than the parallel portion were subjected to masking. The conditions of CCT were as follows. First, 5% NaCl solution was sprayed at an atmospheric temperature of 35° C. for 8 hours (spraying step). Next, the test specimen was retained in an atmosphere of a temperature of 35° C. and a relative humidity of 60% for 16 hours (retention step). With a spray step and a retention step being as 1 cycle, 14 cycles were performed.

An Ono-type rotating bending fatigue test was conducted by using test specimens from which masking had been removed. Specifically, the rotating bending fatigue test in conformity with JIS Z2274 (1974) was conducted in an alternating condition at a rotational frequency of 3000 rpm in the atmosphere at room temperature (25° C.), and the corrosion fatigue strength (MPa) was defined to be the maximum stress at which breakage did not occur after repetition of the number of times of $N=10^7$.

[Test Results]

Test results are shown in Table 1.

Referring to Table 1, the chemical composition of the railway wheel of each of Test Nos. 1 to 13 and Test No. 17 was appropriate, and the area fraction of pearlite of the matrix structure of its plate portion was not less than 95%. As a result, the corrosion fatigue strength was not less than 400 MPa, exhibiting excellent corrosion fatigue resistance.

On the other hand, in Test Nos. 14 to 16, the Sn content was too low. For that reason, the corrosion fatigue strength was less than 400 MPa, exhibiting low corrosion fatigue strength.

So far, embodiments of the present invention have been described. However, the above described embodiments are merely exemplification for carrying out the present invention. Therefore, the present invention will not be limited to the above described embodiments and can be carried out by appropriately altering the above described embodiments within a range not departing from the spirit thereof.

REFERENCE SIGNS LIST

1 Rim portion
2 Plate portion
3 Tread
4 Flange portion
5 Boss portion

The invention claimed is:

1. A railway wheel, comprising a chemical composition consisting of: in mass %,
   C: 0.65 to 0.80%,
   Si: 0.10 to 1.0%,
   Mn: 0.10 to 1.0%,
   P: not more than 0.030%,
   S: not more than 0.030%,
   Cr: 0.05 to 0.20%,
   Sn: 0.005 to 0.50%,
   Al: 0.010 to 0.050%,
   N: 0.0020 to 0.015%,
   Cu: 0 to 0.20%,
   Ni: 0 to 0.20%,
   Mo: 0 to 0.20%,
   V: 0 to 0.20%,
   Nb: 0 to 0.030%, and
   Ti: 0 to 0.030%,
   with the balance being Fe and impurities, wherein
   in a matrix of a plate portion of the railway wheel, an area fraction of pearlite is not less than 95%.

2. The railway wheel according to claim 1, wherein the chemical composition contains at least one element selected from the group consisting of
   Cu: 0.02 to 0.20% and
   Ni: 0.02 to 0.20%.

3. The railway wheel according to claim 2, wherein the chemical composition contains at least one element selected from the group consisting of
   Mo: 0.005 to 0.20%,
   V: 0.005 to 0.20%,
   Nb: 0.010 to 0.030%, and
   Ti: 0.010 to 0.030%.

4. The railway wheel according to claim 1, wherein the chemical composition contains at least one element selected from the group consisting of
   Mo: 0.005 to 0.20%,
   V: 0.005 to 0.20%,
   Nb: 0.010 to 0.030%, and
   Ti: 0.010 to 0.030%.

* * * * *